United States Patent [19]
Klosa

[11] Patent Number: 5,286,955
[45] Date of Patent: Feb. 15, 1994

[54] METHOD FOR WIRELESS TRANSMISSION OF DATA TO A DATA CARRIER

[75] Inventor: Klaus Klosa, München, Fed. Rep. of Germany

[73] Assignee: Eurosil electronic GmbH, Eching, Fed. Rep. of Germany

[21] Appl. No.: 840,729

[22] Filed: Feb. 21, 1992

[30] Foreign Application Priority Data

Mar. 7, 1991 [DE] Fed. Rep. of Germany ....... 4107311

[51] Int. Cl.⁵ .................................................. G06K 17/00
[52] U.S. Cl. .................................... 235/380; 235/449
[58] Field of Search ............................. 235/380, 449

[56] References Cited

U.S. PATENT DOCUMENTS

| | | | |
|---|---|---|---|
| 4,546,241 | 10/1985 | Walton | 235/380 |
| 4,791,285 | 12/1988 | Ohki | 235/449 |
| 5,030,807 | 7/1991 | Landt et al. | 235/380 |

FOREIGN PATENT DOCUMENTS

| | | |
|---|---|---|
| 0297688 | 1/1989 | European Pat. Off. . |
| 0377257 | 7/1990 | European Pat. Off. . |
| 3010938 | 10/1981 | Fed. Rep. of Germany . |
| 2949075 | 10/1982 | Fed. Rep. of Germany . |
| 3438923 | 5/1985 | Fed. Rep. of Germany . |
| 3439676 | 5/1986 | Fed. Rep. of Germany . |
| 2753941 | 6/1986 | Fed. Rep. of Germany . |
| 3447560 | 8/1988 | Fed. Rep. of Germany . |
| 3714195 | 9/1989 | Fed. Rep. of Germany . |
| 3810702 | 10/1989 | Fed. Rep. of Germany . |
| 3932035 | 5/1990 | Fed. Rep. of Germany . |
| 2748584 | 1/1991 | Fed. Rep. of Germany . |
| 3920666 | 1/1991 | Fed. Rep. of Germany . |
| 4100693 | 7/1991 | Fed. Rep. of Germany . |
| 9492 | 1/1991 | Japan ................................ 235/380 |
| WO89/01208 | 2/1989 | PCT Int'l Appl. . |
| 86/04705 | 8/1986 | World Int. Prop. O. . |
| 89/01208 | 2/1989 | World Int. Prop. O. . |

OTHER PUBLICATIONS

Wigand, Die Karte mit dem Chip, Verlag Siemens AG, 1991, Berlin, München, pp. 34–36.

*Primary Examiner*—John Sheppard
*Attorney, Agent, or Firm*—Spencer, Frank & Schneider

[57] ABSTRACT

A method is described of wireless transmission of data onto a data carrier, in particular onto a chip card or IC card, by said data carrier being placed in a high-frequency field. To carry out amplitude keying, the field is switched on and off, with the information being here the number of periods transmitted between two transmission intervals. The semiconductor circuit accommodated in the data carrier receives its clock from the received high-frequency field or from an oscillator allocated to the semiconductor circuit, with this clock being off during a transmission gap.

8 Claims, 4 Drawing Sheets

METHOD FOR WIRELESS TRANSMISSION OF DATA TO A DATA CARRIER

BACKGROUND OF THE INVENTION

The invention relates to a method for wireless transmission of data onto a data carrier having a semiconductor circuit, in particular onto a chip card or IC card, and to a circuit array for implementation of said method.

In recent years, so-called chip cards or IC cards have come into increasing use, these being understood as data carriers that range from the familiar credit cards for cash dispensing machines, card telephones and other end units in communications technology, to identification cards for controlling access to sensitive-security zones. IC cards of this type contain a mechanically protected integrated semiconductor circuit with a nonvolatile memory holding person-related and/or non-person-related data. A control logic is needed to read out the data stored and—if necessary in modified form—to read in the data. The circuit accommodated on the IC card does not generally have its own power supply; instead, the power necessary to read out the information is supplied without wires, for example inductively or capacitively, by the appropriate reader unit that reads out the stored information. At the same time, the data is transmitted without wires by suitable modulation of the voltage supply, so that the circuit can transmit data to the reader unit by, for example, field actuation.

The object underlying the present invention is to provide a method for wireless transmission of data onto a data carrier of the stated type that is easy to implement and requires little energy to operate. A further object is to provide a circuit array for implementation of this method.

SUMMARY OF THE INVENTION

The substance of the invention is to carry out amplitude keying for data transmission using the high-frequency field. The information is here the number of periods of the high-frequency field between two transmission gaps. This permits various agreements to be concluded for the data to be transmitted. In addition to transmission of the logic levels "0" and "1", transmission of command instructions or starting sequences is also possible. The energy consumption of the said data carrier is minimized by the fact that the internal clock signal is off during the transmission gaps. The transmission method in accordance with the invention permits very easy actuation of the transmitter, as a result of which a rectangular signal is sufficient for actuation of the transmission coil.

In accordance with an advantageous embodiment of the method in accordance with the invention, allocation of the number of periods of the high-frequency field transmitted between two transmission gaps to the logic levels or command instructions is achieved by comparison of this number of periods with disjoint number ranges, with each of these number ranges being allocated a logic level or command instruction. The result is a particularly dependable transmission method, since identification of the information on the basis of the number of periods means that the latter does not have to correspond exactly to a single numerical value, but must only be possible to allocate to a defined and coherent number range.

In a further preferred embodiment of the invention, the transmission intervals are short compared with the transmission times, so that a storage capacitor of only low capacitance is necessary for bridging the voltage failure.

The clock signal necessary for both the counter and the control unit can on the one hand be derived from the received high-frequency field in accordance with one embodiment of the invention, or on the other hand obtained from an oscillator signal in accordance with another embodiment of the invention.

The other stated object of the invention is solved by the characterizing features of claims 6 and 7.

In accordance with claim 6, the receiving unit controls both a voltage detector and a pulse generating unit. The voltage detector detects the transmission gaps while the pulse generating unit generates from the reception signal a pulse signal for a counter and the control unit. In addition, the voltage detector actuates the pulse generating unit as well as the counter and an evaluation unit. This evaluation unit generates the data from the readings supplied to it by the counter, and passes on this data to the control unit. The data is then stored in a memory, for example an EEPROM.

By contrast, the pulse signal is generated from an oscillator signal in accordance with claim 7, with the pulse generation unit being actuated by the voltage detector only for switching the former on and off.

Since a storage capacitor of only low capacitance is required to bridge the voltage failure, this capacitor is designed in a further embodiment of the circuit array in accordance with the invention as an on-chip capacitor with the semiconductor circuit as an integrated circuit.

In the following, the method in accordance with the invention is illustrated and explained on the basis of an embodiment in conjunction with drawings.

DESCRIPTION OF THE PREFERRED EMBODIMENTS

Figure 1:
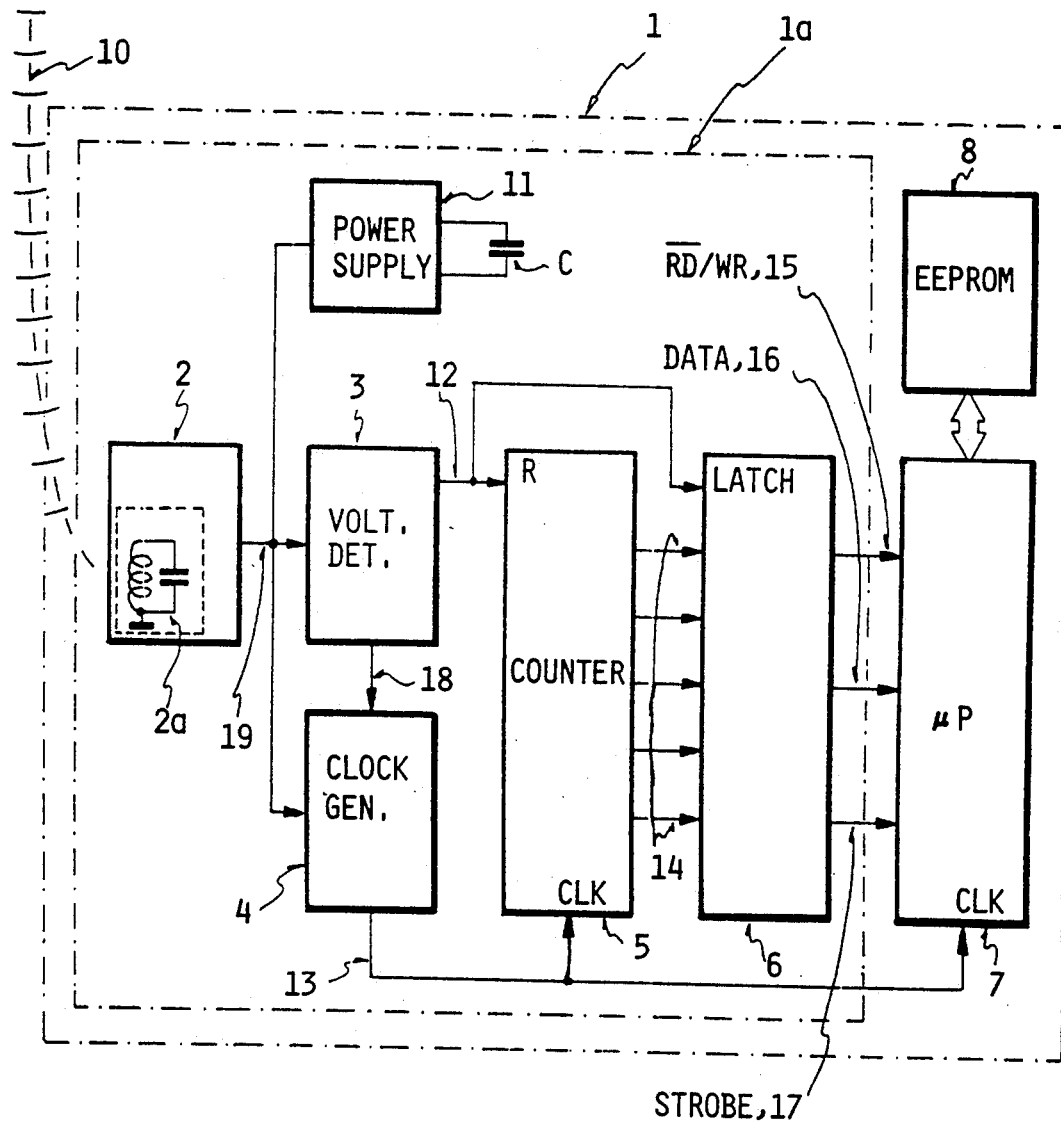
FIG. 1 shows a block diagram to a data carrier with an embodiment of the circuit array in accordance with the invention.

FIG. 1 is a block diagram of an integrated circuit 1, as implanted in an IC card, for example. The information stored in an EEPROM 8 is read out without wires (read mode) via a reader or control unit 9 with a high-frequency transmitter 9a generating a high-frequency field 10. Data must also be written (write mode) into the said memory 8 via this reader 9, which is achieved by the circuit array in accordance with the invention whose embodiment has the reference 1a. This circuit array 1a for implementation of the method in accordance with the invention decodes the information contained in the high-frequency field 10 and passes it to the control unit 7, for example a microprocessor, for which purpose said circuit array 1a can also be called a decoder. The function units necessary for readout are not shown in this FIG. 1.

The IC card is inductively coupled to the reader unit 9 via the high-frequency field 10 for the transmission of energy and data. For this purpose, a receiving unit 2 contains a resonant circuit 2a whose output signal is passed to a voltage supply unit 11 which in its turn provides the necessary operating voltage for the various components of the IC card.

In addition, the output signal of the receiving unit 2 is supplied both to a voltage detector 3 and to a clock generating unit 4. This clock generating unit 4 generates, from the supplied reception signal, the system clock and supplies the latter to a counter 5 and to the control unit 7. The voltage detector 3, the clock generating unit 4, the counter 5 and an evaluation unit 6 form the decoder 1a already mentioned above, while this decoder 1a together with the receiving unit 2, the voltage supply unit 11, the control unit 7 and the memory 8 form the integrated circuit 1 of the IC card.

Figure 5:
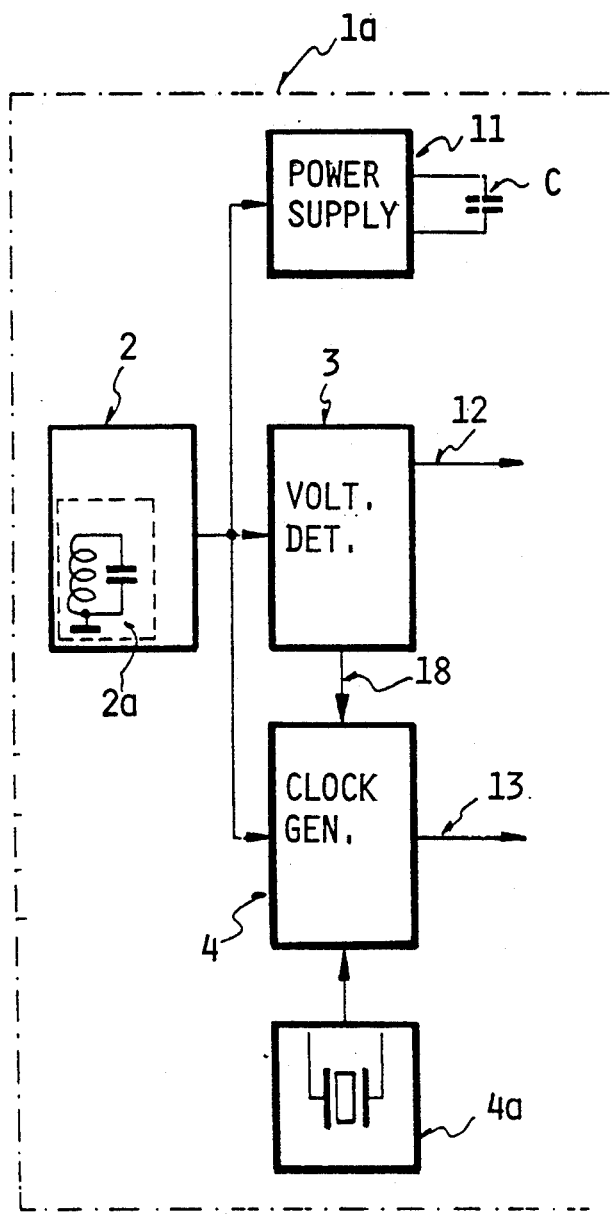
FIG. 5 shows a block diagram of a variant of the embodiment according to FIG. 1.

Instead of deriving the clock from the received high-frequency field 10, it can also be generated by an oscillator 4a in accordance with FIG. 5. To do so, the oscillator signal only is passed to the clock generating unit 4, so that a direct connection to the receiving unit 2 is not necessary.

The method in accordance with the invention comprises transmission of data from the transmitter 9 onto the IC card by timing of the high-frequency field 10, i.e. by switching it off and back on at certain intervals, with the coded information being the number of periods of the high-frequency field 10 transmitted between two transmission gaps. It is therefore possible, for example, to come to an agreement that with transmission of 8 to 15 periods a logic "0" is to be obtained and with 16 to 23 periods a logic "1". The decoder 1a can therefore decode the transmitted information by counting the periods transmitted between two transmission gaps. Further codes for transmission of additional information are feasible, for example for starting sequences or command instructions. It is an advantage with this method to select an OFF time that is short in relation to the ON time, for example such that an OFF time consisting of 10 periods is 80 $\mu$secs at a field frequency of 125 kHz.

Figure 2:
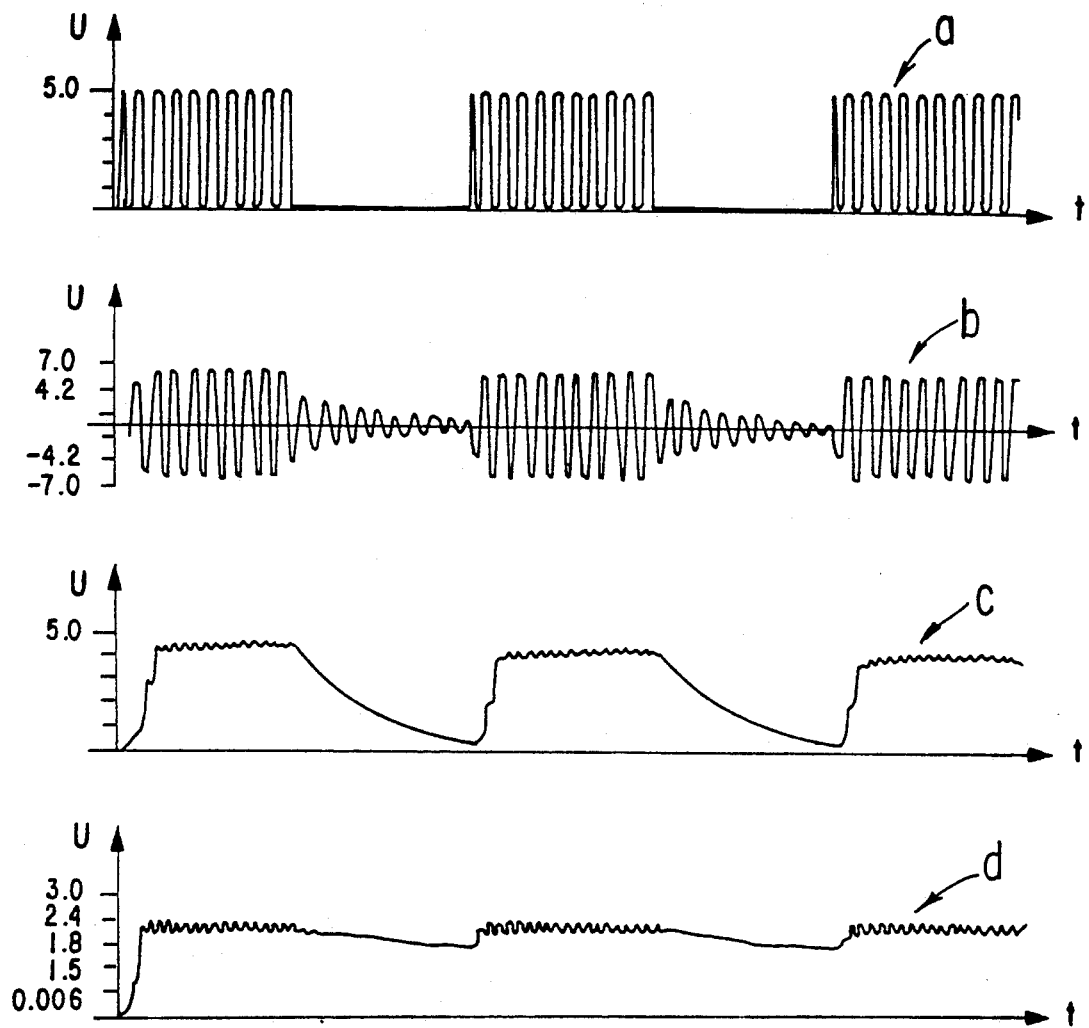
FIG. 2 shows pulse diagrams for illustration of the function of the data transmission in accordance with the invention.

Diagrams a to d of FIG. 2 show the transmission of a "0" sequence. Here, diagram a shows the high-frequency field 10 generated by the transmitter 9a of reader 9 and achieved by actuation of the transmission coil with a rectangular signal. Accordingly, the transmitter 9a is switched off after 10 periods, and switched back on after 10 periods. An interval therefore lasts 10 periods. Diagram b shows the voltage development at the resonant circuit 2a of the receiving unit 2. Accordingly, the resonant circuit voltage is constant during the transmission, but assumes a subdued course during transmission gaps. Diagram c now shows the envelope curve rectified from the curve according to diagram b for detection of the switch-off times of the high-frequency field 10. The switch-off times are passed via a line 12 (FIG. 1) to the counter 5 as a reset signal and to the evaluation unit 6 as a latch signal. This signal furthermore serves to stop the clock of the clock generating unit 4 via a line 18 in accordance with FIG. 1, see also FIG. 3, diagrams a and d where the times $t_1$, $t_3$ and $t_5$ mark these switch-off times. A buffered supply voltage is generated from the pulsating DC voltage according to diagram c of FIG. 2 by the voltage supply unit 11 and the on-chip capacitor C, as shown in diagram d. The voltage failure can therefore be buffered during the transmission intervals with the on-chip capacitance, since no clock is generated during the transmission gaps and only the readings of the counter 5 up to the switch-off time of the high-frequency field have to be recorded in the evaluation unit 6. The integrated circuit 1 of the IC card can therefore dispense with external elements such as support capacitors for the voltage supply.

As already mentioned, the readings of the counter 5 up to the switch-off time of the high-frequency field 10 are stored in the evaluation unit 6 for later evaluation. For this purpose, the counter 5 in accordance with FIG. 1 is connected to the evaluation unit 6 via lines 14. If the high-frequency field 10 restarts—see times $t_2$, $t_4$ and $t_6$ in accordance with FIGS. 3a and 3d —the counter 5 is reset and starts to count up again from zero.

FIG. 3a shows once again the principle of data transmission using the high-frequency field 10. Here, the high-frequency field 10 is switched off at a time $t_1$ and not switched back on until the time $t_2$, for example after 10 periods. The switched-on time is then, for example, 16 to 23 periods, for which reason this means the transmission of a logic "1". At the time $t_3$, the field is again switched off for 10 periods, so that it is again detectable at the time $t_4$ by the receiving unit 2. Now, however, the high-frequency field 10 only remains switched on for 8 to 15 periods in order to transmit a logic "0", i.e. until time $t_5$, and is not switched back on until after 10 further periods, i.e. until time $t_6$. The control signal for the pulse (CLK-ENABLE) associated with this transmission of logic "1" and "0" is shown in FIG. 3d, whereby no clock signal is generated during these transmission gaps.

Figure 3:
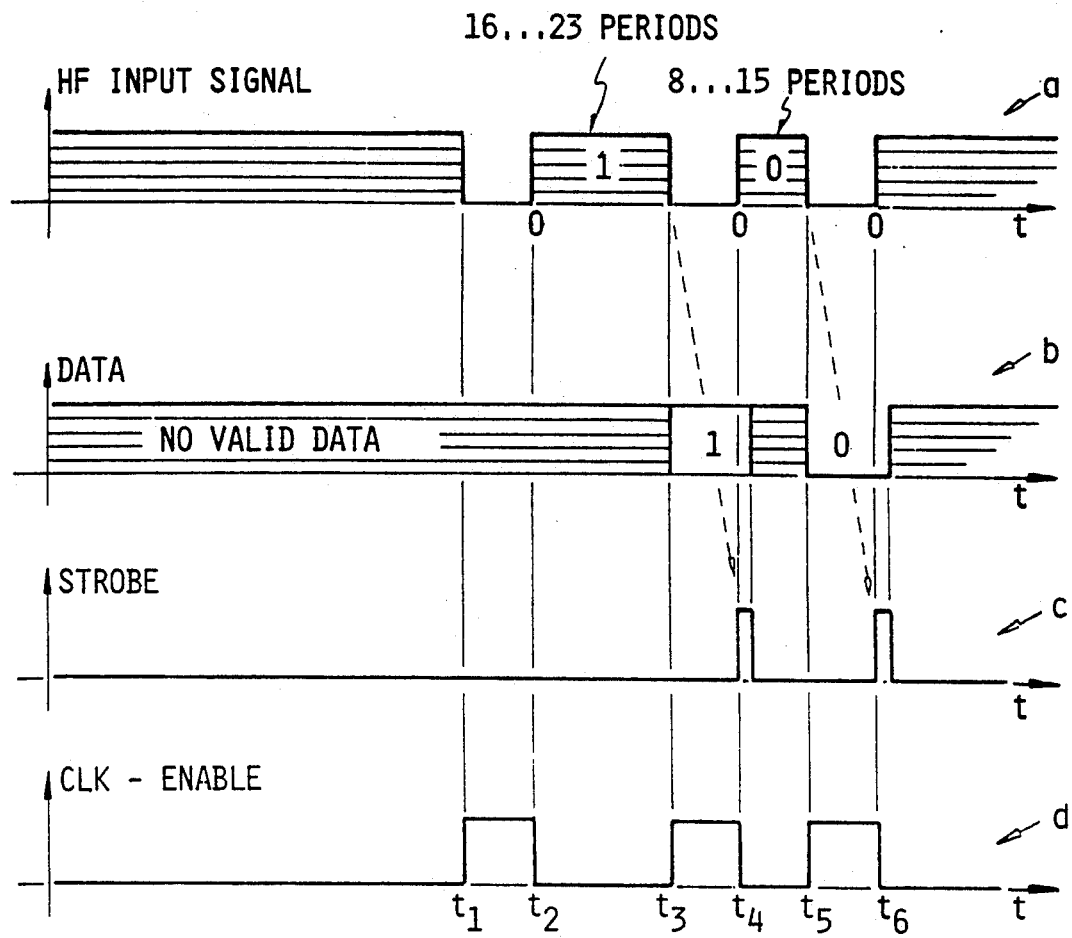
FIG. 3 shows a further pulse diagram for illustration of the mode of operation of the circuit in accordance with the invention.
Figure 4:
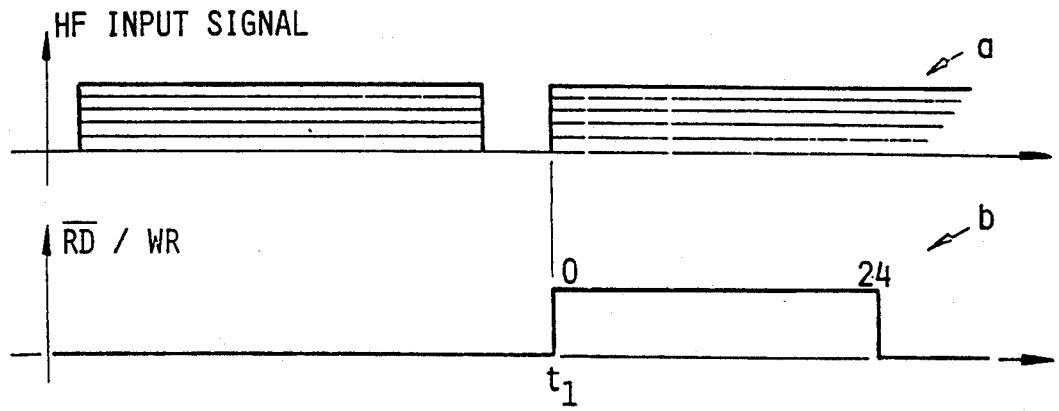
FIG. 4 shows further pulse diagrams for illustration of the mode of operation of the method in accordance with the invention.

The integrated circuit 1 in accordance with FIG. 1 has to distinguish between two modes, namely the read mode and the write mode. The RD/WR signal is used here, which is passed by the line 15 from the evaluation unit 6 to the control unit 7. Accordingly, the control unit 7 must be informed whether the data stored in the memory 8 must be transmitted to the reader 9 or whether data must be received from the reader 9. If after an interruption the transmitter 9a starts to transmit again at a time $t_1$, the counter is reset to zero and the signal on line 15 is set to the H level. This means that the control unit 7 is ready to receive data. If there is no new switch-off of the high-frequency field 10, the counter counts up to 24 and then resets the H level on line 15. Since transmission of a logic "1" value can last for a maximum of 23 periods, no information can be transmitted after 24 periods, therefore. This is shown in FIGS. 4a and b. If however the high-frequency field 10 switches off at time $t_3$ in accordance with FIG. 3, the counter reading obtained up to this point is recorded in the evaluation unit 6. If the pulse switches back on at time $t_4$, this counter reading is further processed, with a logic "1" now being detected. A strobe instruction is now generated on line 17, so that the information present on the data line 16 in accordance with FIG. 3b is transferred from the control unit 7 to the memory 8.

The method in accordance with the invention permits dependable transmission of data to the integrated circuit 1 even with varying distances to the reader 9. In particular, the frequency used is not critical, so that it can be selected from a wide frequency range.

The integrated circuit 1 shown in FIG. 1 for an IC card can be used in many ways for identification systems, with the possibility of installing further functions not shown in FIG. 1, for example a clock.

As already pointed out, the current consumption by the integrated circuit 1 according to FIG. 1 is very low, particularly when the circuit has been designed as a CMOS circuit. It is therefore possible for the current state of the circuit to be maintained during transmission gaps with a relatively small on-chip capacitor.

What is claimed is:

1. A method for wireless transmission of data onto a data carrier having a semiconductor circuit (1), in particular onto a chip card or IC card, wherein the supply voltage of said semiconductor circuit (1) is generated by a high-frequency field (10) in which the data carrier has been placed, characterized by the following features:
   a) for transmission of logic levels and command instructions said high-frequency field (10) is switched off and on such that the duration of the transmission intervals is constant whereas the transmission duration is of varying length depending on the logic levels and command instructions to be transmitted,
   b) the transmission duration is determined from the number of periods transmitted of said high-frequency field (10),
   c) to retrieve the data transmitted with said high-frequency field (10), the number of periods of said high-frequency field (10) transmitted between two transmission gaps is ascertained, stored and evaluated,
   d) to ascertain the number of periods, a clock signal is generated exclusively during the transmission times,
   e) to minimize the current consumption of said semiconductor circuit (1), the clock signal is off during the transmission gaps.

2. A method according to claim 1, wherein allocation of said number of periods of said high-frequency field (10) transmitted between two transmission intervals to said logic levels or command instructions is achieved by comparison of said number of periods with disjoint number ranges, with each of said number ranges being allocated a logic level or command instruction.

3. A method according to claim 2, wherein said transmission intervals are short in relation to said transmission times.

4. A method according to claim 1, wherein a clock signal is obtained from said high-frequency field (10).

5. A method according to claim 1, wherein an oscillator is provided for generation of a clock signal.

6. A circuit array for implementation of the method according to claim 1, wherein said semiconductor circuit (1) has a control unit (7) having a memory (8), characterized by the following features:
   a) for detection of said high-frequency field (10), a receiving unit (2) is provided that supplies the received signals to a voltage detector (3), to a clock generating unit (4) and to a voltage supply unit (11),
   b) furthermore, a counter (5) and an evaluation unit (6) are provided,
   c) said clock generating unit (4) supplies a clock signal to said counter (5) and said control unit (7),
   d) said voltage detector (3) controls said clock generating unit (4) as a function of said timed high-frequency field (10) and supplies a reset or latch signal to said counter (5) or said evaluation unit (6) respectively,
   e) said counter (5) supplies its readings to said evaluation unit (6) for evaluation, said evaluation unit in its turn passing the data generated from said readings to said control unit (7).

7. A circuit array according to claim 6, wherein a storage capacitor (C) is allocated for generation of the supply voltage of said voltage supply unit (11) and is integrated as an on-chip capacitor with said semiconductor circuit (1) designed as an integrated circuit.

8. A circuit array for implementation of the method according to claim 1, wherein said semiconductor circuit (1) has a control unit (7) having a memory (8), characterized by the following features:
   a) for detection of said high-frequency field (10), a receiving unit (2) is provided that supplies the received signals to a voltage detector (3) and to a voltage supply unit (11),
   b) furthermore, a counter (5) and an evaluation unit (6) are provided,
   c) furthermore, a clock generating unit (4) is provided that generates by means of the oscillator (4a) a clock signal that is supplied to said counter (5) and to the control unit (7),
   d) said voltage detector (3) controls said clock generating unit (4) as a function of said timed high-frequency field (10) and supplies a reset or latch signal to said counter (5) or said evaluation unit (6) respectively,
   e) said counter (5) supplies its readings to said evaluation unit (6) for evaluation, said evaluation unit in its turn passing the data generated from said readings to said control unit (7).

* * * * *